United States Patent
Lin

(10) Patent No.: US 6,178,443 B1
(45) Date of Patent: Jan. 23, 2001

(54) METHOD AND APPARATUS FOR PROPAGATING USER PREFERENCES ACROSS MULTIPLE COMPUTER ENVIRONMENTS

(75) Inventor: Chichuan Michael Lin, Chandler, AZ (US)

(73) Assignee: Intel Corporation, Santa Clara, CA (US)

( * ) Notice: Under 35 U.S.C. 154(b), the term of this patent shall be extended for 0 days.

(21) Appl. No.: 08/772,221

(22) Filed: Dec. 20, 1996

(51) Int. Cl.[7] .................................................. G06F 15/16
(52) U.S. Cl. ..................... 709/208; 709/202; 709/209; 709/227; 707/104; 707/201
(58) Field of Search ........................ 395/200.31–200.33, 395/200.38–200.39, 200.55–200.59, 200 T; 707/10, 9, 200–201, 100–104; 709/200–203, 208–209, 227–228, 238–239

(56) References Cited

U.S. PATENT DOCUMENTS

| 4,800,488 | * | 1/1989 | Agrawal et al. | 709/225 |
| 5,541,927 | * | 7/1996 | Kristol et al. | 370/408 |
| 5,630,116 | * | 5/1997 | Takaya et al. | 707/201 |
| 5,678,041 | * | 10/1997 | Baker et al. | 709/229 |
| 5,819,284 | * | 10/1998 | Farber et al. | 707/104 |

* cited by examiner

Primary Examiner—Ahmad F. Matar
Assistant Examiner—Bharat Barot
(74) Attorney, Agent, or Firm—Kenyon & Kenyon

(57) ABSTRACT

An embodiment of the present invention provides a method for propagating user preference information among a plurality of local computers coupled to a repository computer, where each local computer has one or more user-controllable parameters. According to the embodiment, the repository computer maintains central user preference information and transmits that information to a local computer. The local computer uses the transmitted user preference information to update one or more of its user-controllable parameters.

23 Claims, 3 Drawing Sheets

METHOD AND APPARATUS FOR PROPAGATING USER PREFERENCES ACROSS MULTIPLE COMPUTER ENVIRONMENTS

BACKGROUND OF THE INVENTION

The present invention relates generally to the field of personal computing, and in particular to a method and apparatus for propagating user preferences across multiple computer environments. The invention has particular usefulness for users who routinely access a number of different computers, often at different physical locations, for work and/or personal purposes. The present invention can relieve such users from having to separately establish preferences at each such computer relating to, for example, keyboard and display settings, word processing software settings, Internet browser "bookmarks," and the like.

In today's increasingly computer-dependent society, it is becoming more and more common for people to have or use multiple computers. In a work environment, for example, a person may use a desktop personal computer (PC) in his or her office, another desktop or laptop PC in a development lab, and yet another laptop PC for use when traveling. In addition, this same person may have a desktop PC at home which he or she uses for both work-related and recreational activities. A common problem faced by these multi-computer users is that user-controllable system and software preferences are generally not configured in the same way across these various computers because of a variety of system and software complexities. This problem can cause untold frustration for users forced to continually reenter or change configurations to maintain some semblance of uniformity across multiple computer environments.

SUMMARY OF THE INVENTION

An embodiment of the present invention provides a method for propagating user preference information among a plurality of local computers coupled to a repository computer, where each local computer has one or more user-controllable parameters. According to the embodiment, the repository computer maintains central user preference information and transmits that information to a local computer. The local computer uses the transmitted user preference information to update one or more of its user-controllable parameters.

DETAILED DESCRIPTION

The present invention provides a method and apparatus for propagating user preferences across multiple computer environments. The invention solves the problem of inconsistent configurations often faced by users who have or use multiple computers, eliminating the need to continually reenter or change configurations to maintain consistency.

Figure 1:
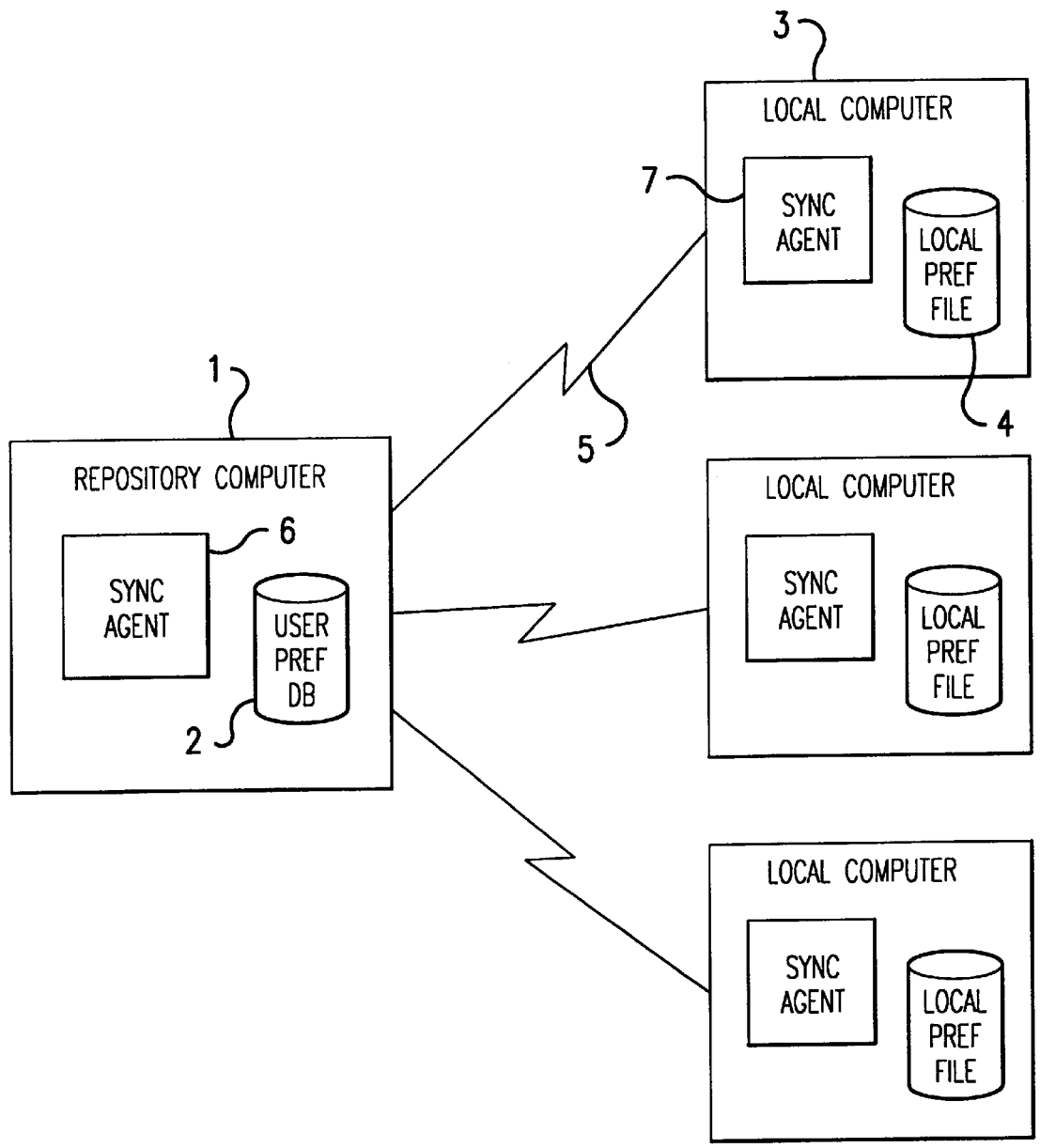
FIG. 1 illustrates schematically an embodiment of the present invention in which a plurality of local computers access a central repository of user preference information.

Referring now to FIG. 1, an embodiment of the present invention includes a repository computer 1 capable of communicating with a plurality of local computers 3 over a communications link 5. Repository computer 1 may be any computer having sufficient memory and processing power to serve as a central repository for user preference information, including a standard desktop PC. Alternatively, repository computer 1 may be a dedicated network server machine. Other than the general requirements of a reasonable amount of available memory and processing power, the present invention does not depend upon any particular characteristics of repository computer 1.

Repository computer 1 includes a central user preference database 2 for maintaining user preference information for a plurality of system users. The stored user preference information may be, for example, preferences as to system configuration parameters, such as display resolution, keyboard speed and audio volume, or application-level parameters, such as default settings for word processing software or URL "bookmarks" for Internet browsers. All user preference information in central user preference database 2 is preferably associated with a unique userid identifying a system user with whom the information is associated.

In the embodiment of FIG. 1, local computer 3 may be, for example, any desktop or laptop PC capable of communicating with repository computer 1. Local computer 3 preferably includes a local user preference file 4 which, similar to central user preference database 2, maintains user-specific preference information. Here, however, the preference information would be limited to users of local computer 3, whereas central user preference database 2 may contain user preference information for a potentially much larger population of users.

Communications link 5 coupling repository computer 1 and local computers 3 may be any medium enabling computer-to-computer communications. Examples of suitable communications media include a local area network (LAN), such as a token ring or Fast Ethernet LAN, an Internet or intranet network, a POTS (Plain Old Telephone System) connection, a wireless connection and a satellite connection. The present invention is not dependent upon any particular medium for communications link 5, the sole criterion being the ability to carry user preference information and related data in some form from one computer to another.

Repository computer 1 includes a server-side synchronization agent 6 which provides functionality relating to the maintenance and distribution of central user preference information. Server-side synchronization agent 6 is preferably implemented as a software routine which is loaded whenever repository computer 1 is powered up, and which remains active until repository computer 1 is powered down. Where repository computer 1 includes, for example, a Windows™3.n/95 operating system, server-side synchronization agent 6 may be implemented as a dynamic link library (DLL) invoked automatically at startup. Similarly, in a DOS environment, server-side synchronization agent 6 may be an executable program initiated by the AUTOEXEC.BAT file. Other implementations are also possible, depending upon the characteristics of the particular operating environment of repository computer 1.

Server-side synchronization agent 6 preferably has read-write access to central user preference database 2. Central user preference database 2 may be implemented as a relational database accessible through SQL (Structured Query Language). Alternatively, central user preference database 2 may be some other type of data structure, such as a hierarchical database or a sequential file. For efficiency purposes, server-side synchronization agent 6 is preferably able to directly access user preference information for any given userid or other form of user identification.

Similar to repository computer 1, local computer 3 includes a client-side synchronization agent 7 responsible for maintenance and use of user preference information. Client-side synchronization agent 7 also preferably runs whenever local computer 3 is powered on. Client-side synchronization agent 7 preferably has read-write access to local user preference file 4. Local user preference file 4 may be a stand-alone data structure which client-side synchronization agent 7 uses as a local repository of user preference information, or local user preference file 4 may comprise a collection of data structures used by an operating system and/or application programs installed on local computer 3 to maintain user-controllable settings.

Figure 2:
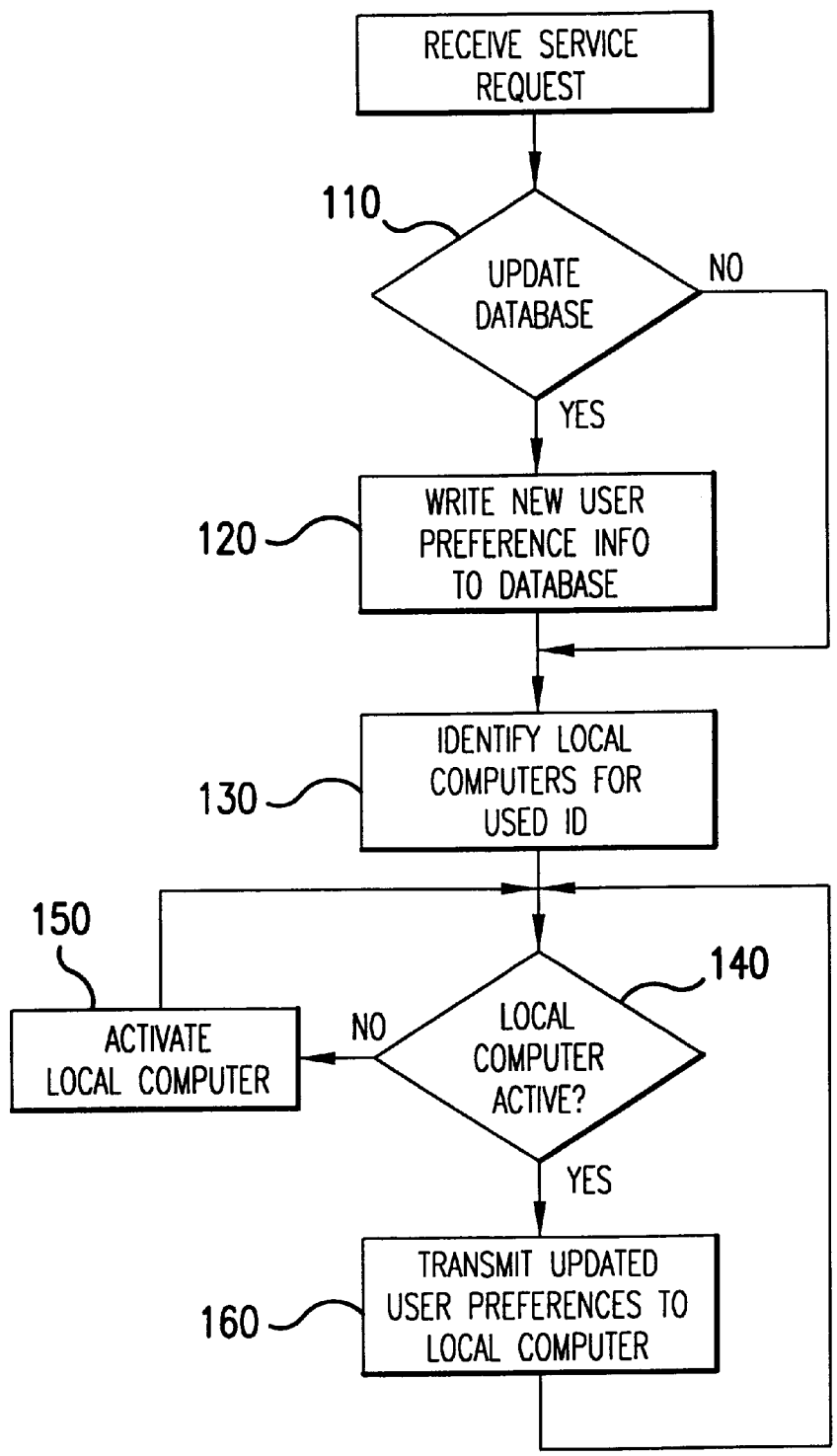
FIG. 2 describes processing performed by a repository computer according to an embodiment of the present invention.
Figure 3:
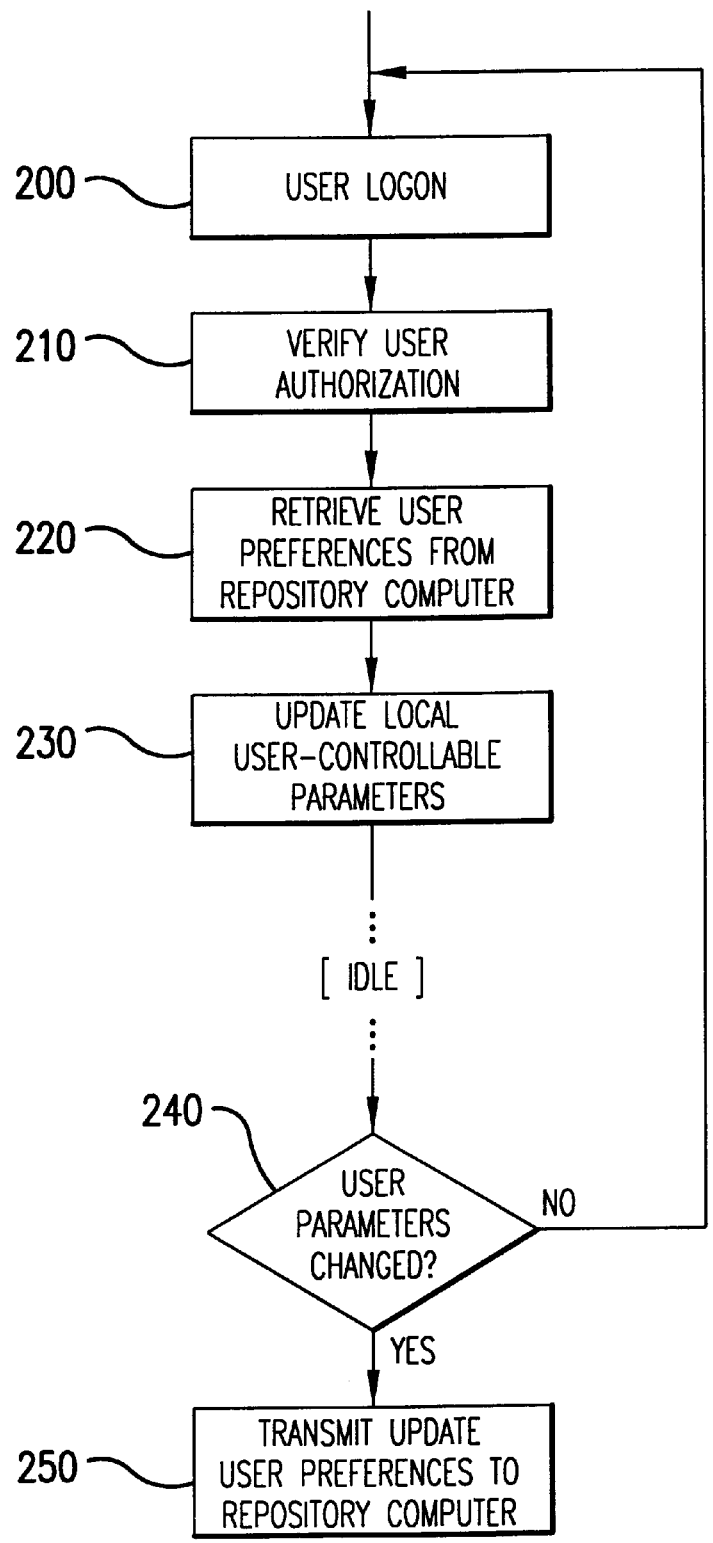
FIG. 3 describes processing performed by a local computer according to an embodiment of the present invention.

Turning now to functional features of the present invention, FIG. 2 and FIG. 3 describe a method for propagating user preference information to multiple computers according to an embodiment of the present invention. FIG. 2 describes the method from the perspective of a repository computer, while FIG. 3 describes the method from the perspective of a local computer. For illustration purposes, structural features are identified using the same reference numbers used in FIG. 1; however, the method illustrated in FIG. 2 and FIG. 3 is not limited to that structural embodiment.

Referring now to FIG. 2, server-side synchronization agent 6 loaded on repository computer 1 is activated upon receipt of a service request (Step 100). A service request may be originated by a user of repository computer 1, such as a request to maintain user preference information in central user preference database 12. A service request may also be originated by local computer 3, such as a request to download user preference information to local computer 3 or a request to update central user preference database 2 with new user preference information input at local computer 3.

Server-side synchronization agent 6 analyzes the received service request to determine whether central user preference database 2 is to be updated (Step 110). If so, server-side synchronization agent 6 preferably extracts a unique userid from the received request and uses that userid to call central user preference database 2 to retrieve any previously-stored user preference information for the userid. If entries exist in central user preference database 2 for the userid, server-side synchronization agent 6 updates those entries as appropriate based on the content of the received request, and writes the updated entries back to central user preference database 2; if no such entries exist for the userid, server-side synchronization agent 6 formats new entries and writes those new entries to central user preference database 2 (Step 120).

Once any necessary updates are made to central user preference database 2, server-side synchronization agent 6 identifies which local computer(s) 3 are to receive updated user preference information as a result of the service request (Step 130). Where, for example, the service request is a request from a particular local computer 3 for a download of the most-current user preference information, server-side synchronization agent 6 may transmit the appropriate information only to that local computer 3. On the other hand, where the service request necessitated an update to central user preference database 2, server-side synchronization agent 6 preferably transmits the updated user preference information to all of the computers associated with the userid in the service request. To this end, central user preference database 2 may include a table or other data structure associating userids with one or more local computers 3. Such a table or other data structure also preferably includes address information for all such local computers 3, such as a TCP/IP address or a LAN node ID, to enable server-side synchronization agent 6 to transmit information to such local computers 3.

Where a local computer 3 other than the one that originated the service request is to receive updated user preference information, server-side synchronization agent 6 preferably determines whether the target local computer is activated (powered on) (Step 140). If not, server-side synchronization agent 6 may transmit an appropriate command, using known technologies, to cause the target local computer 3 to turn itself on (Step 150). Once it confirms the target computer is activated, server-side synchronization agent 6 may transmit the mostcurrent user preference information associated with the userid in the service request to local computer 3 (Step 160).

To some degree, the nature of communications link 5 controls the manner in which server-side synchronization agent 6 is able to ensure that multiple local computers 3 associated with a given userid receive current user preference information. Where, for example, repository computer 1 and local computers 3 are all installed in a single network, server-side synchronization agent 6 may issue a broadcast-type call to simultaneously transmit current user preference information to all appropriate local computers 3. In some embodiments, however, any given local computer 3 may be directly coupled to only one other computer, either repository computer 1 or another local computer 3. In such a case, server-side synchronization agent 6 may propagate central user preference information in a token-passing manner. In other words, server-side synchronization agent 6 may transmit user preference information to a first local computer 3, first local computer 3 could update its local user preferences and retransmit the information to a second local computer 3 coupled to first local computer 3, and so on until all local computers 3 associated with the userid are updated. Yet another possibility is that server-side synchronization agent 6 is restricted to transmitting user preference information only to a local computer 3 which originates a service request.

Referring now to FIG. 3, processing begins in client-side synchronization agent 7 when a new user logs on to local computer 3 (Step 200). Where local computer 3 is accessible to multiple users, such as a computer in a development lab, it is desirable for client-side synchronization agent to include a security mechanism to ensure potentially-sensitive user preferences (or potentially-sensitive information accessible as a result of particular user preferences) are only available to authorized personnel. Accordingly, client-side synchronization agent 7 may require the new user to verify his or her authorization (Step 210). This may be done, for example, using an assigned userid or password, fingerprint matching or voiceprint matching. Client-side synchronization agent 7 may provide default user preference information to be used in the event the new user lacks appropriate authorization.

Once a user is logged in and his or her authorization is verified, client-side synchronization agent 7 tries to retrieve the most current user preference information for the user from repository computer 1 (Step 220). If repository computer 1 successfully returns the requested user preferences, client-side synchronization agent 7 implements those preferences in local computer 3 by, or example, updating system configuration files and application program preference files (Step 230). If repository computer 1 fails to return the requested information, either because no such information exists in central user preference database 2 or because of some problem with communications link 5, client-side synchronization agent 7 may attempt to retrieve user preference information for the current user from local user preference file 4. If local user preference information is found, client-side synchronization agent 7 implements those preferences; otherwise, client-side synchronization agent 7 may implement a set of default user preferences.

Once appropriate user preferences are implemented, client-side synchronization agent 7 ideally enters an idle state until a predetermined event occurs to trigger further processing. For example, client-side synchronization agent 7 may idle until the current user logs off of local computer 3. At that time, client-side synchronization agent 7 may compare current system settings to those it originally established as a result of the previously-stored user preference information to determine whether any user preferences changed during the just-completed user session (Step 240). If so, client-side synchronization agent 7 transmits the locally-updated user preference information to repository computer 1 (Step 250), thereby enabling repository computer 1 to propagate the most-current user preferences to other local computers 3 associated with that user. Alternatively, client-side synchronization agent 7 may inform repository computer 1 of user preference updates on an ad hoc basis. For example, where a user changes settings in a particular application, such as adding new bookmarks in an Internet browser, client-side synchronization agent 7 may transmit the updates to repository computer 1 as soon as the user exits the application.

In the embodiment illustrated in FIG. 1, server-side synchronization agent 6 and client-side synchronization agent 7 are illustrated as distinct software modules. Nevertheless, to maximize flexibility and production efficiency, both agents may be incorporated as part of a single application program configurable to function either as a server-side or a client-side synchronization agent.

Server-side synchronization agent 6 and/or client-side synchronization agent 7 may be distributed as pre-loaded software (comprising a set of executable instructions) resident in a memory of a personal computer, such as the hard-disk of a desktop or laptop computer. Alternatively, the software may be distributed to users in the form of a user-installable program stored on any of a variety of portable media, including diskette and CD. Yet another possibility is that the software could be made available on a network server for downloading upon request by a user.

The foregoing is a detailed description of particular embodiments of the present invention as defined in the claims set forth below. The invention embraces all alternatives, modifications and variations that fall within the letter and spirit of the claims, as well as all equivalents of the claimed subject matter.

What is claimed is:

1. A method for propagating user preference information among a plurality of local computers, wherein each local computer is coupled to a repository computer and has one or more user-controllable parameters, said method comprising the steps of:

maintaining user preference information regarding hardware and/or software configurations corresponding to each of a plurality of users on the repository computer;

associating a user of a local computer with corresponding user preference information on the repository computer;

transmitting the corresponding user preference information to the local computer; and updating one or more user-controllable parameters of the local computer according to the transmitted corresponding user preference information.

2. The method of claim 1, wherein the repository computer transmits the corresponding user preference information upon receipt of a service request from the local computer.

3. The method of claim 1, wherein the repository computer transmits the corresponding user preference information following an update to the corresponding user preference information.

4. The method of claim 3, wherein the repository computer ensures the local computer is activated prior to transmitting the corresponding user preference information.

5. The method of claim 1, wherein the corresponding user preference information transmitted by the repository computer is propagated to a plurality of local computers.

6. The method of claim 5, wherein the repository computer transmits the corresponding user preference information to each of the plurality of local computers.

7. The method of claim 5, wherein each of the plurality of local computers is capable of communicating with at least one other of the plurality of local computers, said method further comprising the step of transmitting the corresponding user preference information from a first local computer to a second local computer.

8. The method of claim 7, wherein the corresponding user preference information originally transmitted by the repository computer is passed among the plurality of local computers until all of the plurality of local computers have received the corresponding user preference information.

9. The method of claim 1, wherein the repository computer comprises one of the plurality of local computers.

10. The method of claim 1, wherein the repository computer comprises a server computer to which each of the plurality of local computers is coupled.

11. A computer system in which user preference information is propagated among a plurality of computers, said computer system comprising:

one or more local computers, each of said local computers including a local data store containing user preference information regarding hardware and/or software configurations, said local data store being used by said local computer to establish default settings for one or more user-controllable parameters; and a repository computer coupled to said one or more local computers, said repository computer including a database containing user preference information corresponding to each of a plurality of users and program code for selectively transmitting user preference information to a local computer, wherein the transmitted user preference information corresponds to a particular user of the local computer.

12. The computer system of claim 11, wherein said one or more local computers further include program code for transmitting to said repository computer a service request for user preference information corresponding to a particular user of the local computer, and said repository computer further includes program code for transmitting requested user preference information to said one or more local computers in response to said service request.

13. The computer system of claim 11, wherein said repository computer further includes program code for automatically transmitting user preference information to a local computer following an update of said user preference information on said repository computer.

14. The computer system of claim 13, wherein said repository computer further includes program code for activating a local computer prior to transmitting said user preference information to said local computer.

15. The computer system of claim 11, wherein said repository computer comprises a server computer and each of said one or more local computers comprises a client computer, said server computer and said client computers being coupled to one another over a network.

16. An instruction set residing on a storage medium for propagating user-specific configuration information among a plurality of computers, said instruction set comprising instructions for:

maintaining a central database of user preference information corresponding to each of a plurality of users, wherein said user preference information comprises information relating to at least one of a software configuration and a hardware configuration for a user computer; and transmitting user preference information to a computer associated with a selected one of said plurality of users.

17. The instruction set of claim 16, further comprising instructions for:

identifying one or more computers associated with the selected user;

transmitting user preference information to each of said identified computers following an update of said user preference information included in said central database.

18. The instruction set of claim 17, further comprising instructions for ensuring said one or more computers are activated prior to transmitting said user preference information.

19. The instruction set of claim 16, further comprising instructions for:

reading a communication from a remote computer to identify a user of said remote computer; and retrieving user preference information corresponding to said identified user from said central database.

20. The instruction set of claim 16, wherein said storage medium comprises a permanent storage device installed in a computer.

21. An apparatus for propagating user preference information among a plurality of local computers, wherein each of the plurality of local computers includes a local data store containing user preference information regarding hardware and/or software configurations, the local data store being used by the local computer to establish settings for one or more user-controllable parameters, said apparatus being coupled to at least one of the plurality of local computers and including a database containing user preference information corresponding to each of a plurality of uniquely-identifiable users and program code for selectively transmitting user preference information to a local computer for updating the local data store of the local computer, said transmitted user preference information corresponding to an identified user of the local computer.

22. The apparatus of claim 21, further including program code for automatically transmitting user preference information to a local computer following an update of said user preference information included in the database.

23. The apparatus of claim 21, further including program code for activating a local computer prior to transmitting said user preference information to the local computer.

* * * * *